United States Patent
Timoney

(10) Patent No.: US 10,641,345 B2
(45) Date of Patent: May 5, 2020

(54) SHIFTING DEVICE FOR A CLUTCH

(71) Applicant: Timoney Dynamic Solutions Limited, County Meath (IE)

(72) Inventor: Eanna Pronsias Timoney, County Cork (IE)

(73) Assignee: Timoney Dynamic Solutions Limited, Johnstown, Navan, County Meath (IE)

( * ) Notice: Subject to any disclaimer, the term of this patent is extended or adjusted under 35 U.S.C. 154(b) by 280 days.

(21) Appl. No.: 15/301,662

(22) PCT Filed: Apr. 7, 2015

(86) PCT No.: PCT/EP2015/057529
§ 371 (c)(1),
(2) Date: Oct. 3, 2016

(87) PCT Pub. No.: WO2015/150579
PCT Pub. Date: Oct. 8, 2015

(65) Prior Publication Data
US 2017/0175824 A1    Jun. 22, 2017

(30) Foreign Application Priority Data

Apr. 4, 2014 (IE) ..................................... 2014/0095
Aug. 19, 2014 (EP) ..................................... 14181473

(51) Int. Cl.
*F16D 23/14* (2006.01)
*B60K 23/04* (2006.01)
(Continued)

(52) U.S. Cl.
CPC ............. *F16D 23/14* (2013.01); *B60K 23/04* (2013.01); *F16D 11/14* (2013.01); *F16H 48/24* (2013.01);
(Continued)

(58) Field of Classification Search
CPC ............... F16D 2023/141; F16D 23/14; F16H 2063/321
See application file for complete search history.

(56) References Cited

U.S. PATENT DOCUMENTS 3,788,157 A * 1/1974 Carlson ................... F16H 63/30
192/48.607
5,205,179 A   4/1993 Schneider
(Continued)

FOREIGN PATENT DOCUMENTS

BE           683839 A    12/1966
DE      44 43 783 A1    8/1995
(Continued)

OTHER PUBLICATIONS

Machine translation of FR2486450 (Year: 2019).*
Search Report from corresponding U.K. Patent Application No. GB1406162.6 dated Oct. 14, 2014.

*Primary Examiner* — Stacey A Fluhart
(74) *Attorney, Agent, or Firm* — Michael Crilly, Esq.

(57) ABSTRACT

A shifting device for a positively engaging clutch having complementary first and second positively engaging coupling elements includes a housing and an actuator rod which is axially movable within the housing by means of an associated rod actuating mechanism. A clutch shift fork for engagement with the first coupling element is mounted on the actuator rod for axial movement of the first coupling element into and out of engagement with the second coupling element in response to axial movement of the actuator rod. The clutch shift fork is mounted on the actuator rod by a threaded connector such that the clutch shift fork is axially movable on the actuator rod. Thus conveniently the axial position of the clutch fork on the shaft may be altered by (Continued)

rotating the shaft relative to the clutch fork for accurate positioning of the clutch fork relative to the coupling element with which it engages.

12 Claims, 3 Drawing Sheets

(51) Int. Cl.
  *F16H 63/32* (2006.01)
  *F16D 11/14* (2006.01)
  *F16H 48/24* (2006.01)
  *F16H 48/32* (2012.01)

(52) U.S. Cl.
  CPC ........ *F16H 63/32* (2013.01); *B60K 2023/046* (2013.01); *B60Y 2400/421* (2013.01); *F16D 2023/141* (2013.01); *F16H 48/32* (2013.01); *F16H 2063/321* (2013.01)

(56) References Cited

U.S. PATENT DOCUMENTS

| | | | | |
|---|---|---|---|---|
| 5,573,096 A | * | 11/1996 | Erlebach | ................ B60K 23/02 192/110 R |
| 5,673,777 A | * | 10/1997 | Ziech | ...................... F16H 48/08 192/108 |
| 5,878,624 A | * | 3/1999 | Showalter | ............. F16H 63/304 74/473.37 |
| 5,947,252 A | | 9/1999 | Ziech | |
| 2002/0169049 A1 | | 11/2002 | Borgan et al. | |
| 2005/0252732 A1 | * | 11/2005 | Hashida | .................... B60T 8/32 188/71.9 |
| 2006/0131112 A1 | * | 6/2006 | Hashida | .................. B60T 17/16 188/71.9 |

FOREIGN PATENT DOCUMENTS

| | | | |
|---|---|---|---|
| DE | 103 06 994 A1 | 9/2004 | |
| DE | 10 2008 040206 A1 | 1/2010 | |
| EP | 0 598 234 A1 | 5/1994 | |
| FR | 2486450 A1 * | 1/1982 | ............ B30B 1/106 |
| GB | 1344115 | 1/1974 | |
| JP | 61-10350 U | 10/1986 | |
| RU | 2024005 C1 | 11/1994 | |
| SU | 617624 A1 | 7/1978 | |
| WO | 2011/034489 A1 | 3/2011 | |

* cited by examiner

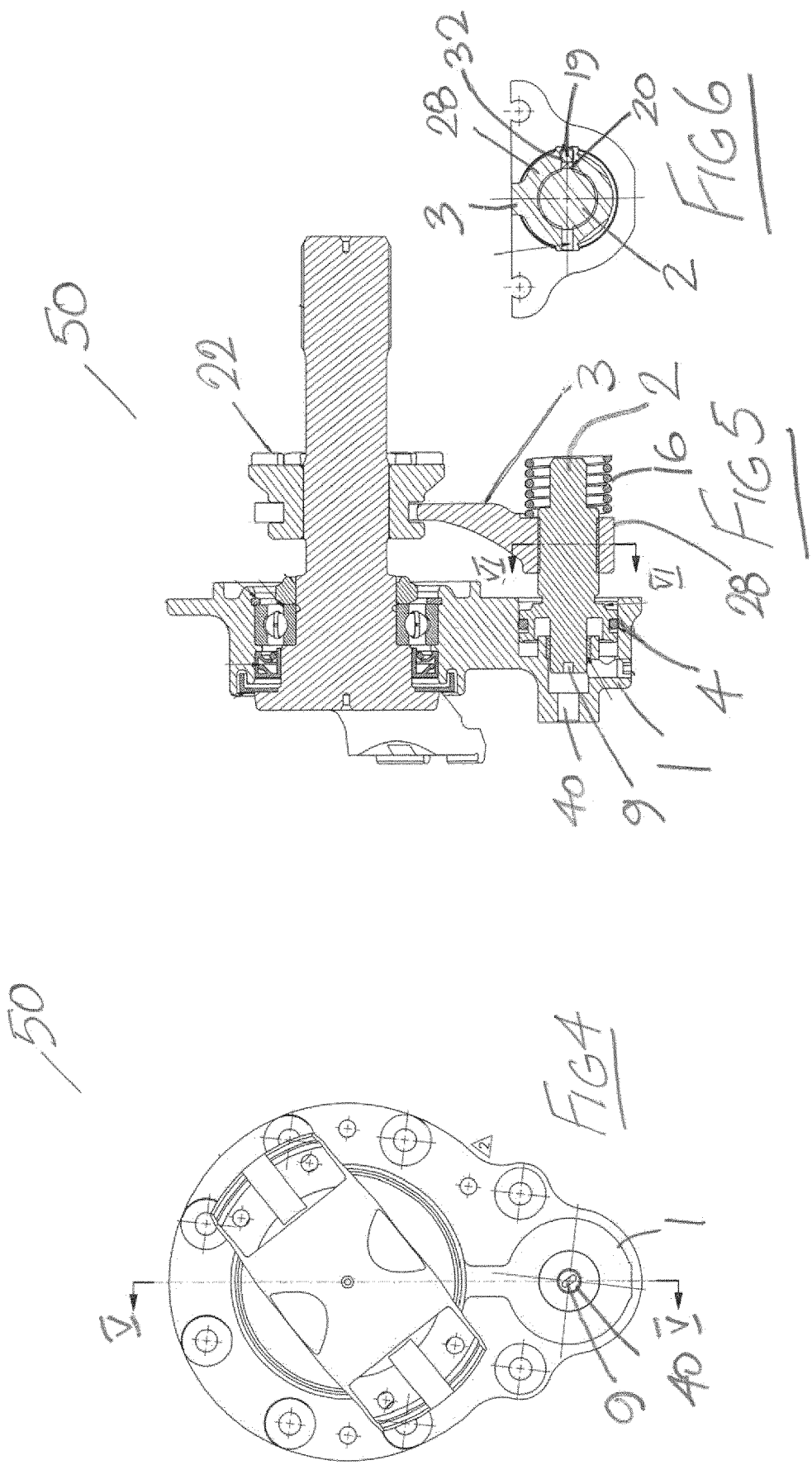

SHIFTING DEVICE FOR A CLUTCH

This invention relates to a shifting device for a positively engaging clutch such as a dog clutch. In various multi axle vehicle drivelines it is desirable to have means to disconnect the drive or lock the differential mechanism. Such locking or disconnect mechanisms frequently employ a dog clutch arrangement in which the dog clutch may be engaged or disengaged by being moved axially by means of a fork mechanism.

BACKGROUND OF THE INVENTION

A variety of dog clutch mechanisms have been described by others—U.S. Pat. No. 4,977,989; US2,010/0276245 U.S. Pat. Nos. 7,055,664B2; 3,834,500; 7,413,067B2; 4,529,080. In some applications typically involving high speeds and/or torques it is desirable that a degree of precision be achieved in the engagement and disengagement of the clutch such that engagement times are minimised by reducing the disengaged axial clearance to a minimum. It is also desirable that unwanted forces be avoided such as the bending forces that would be imposed on the fork by over stroking on engagement and also the wear and friction that would be imposed on the fork if it was under continuous load whilst engaged or disengaged. Thus it is desirable that the axial stroke length be also accurately controlled. Thus it is desirable that both the position of the fork in relation to the clutch faces and the stroke length of the fork be accurately controlled. To achieve the required precision without an adjustment mechanism would require excessively close manufacturing tolerances of the individual components to avoid excessive build-up of tolerances in the final assembly. Such close tolerances in manufacture result in an undesirable increase in costs.

An adjustable clutch mechanism which attempts to meet these requirements has been described by Erlebach U.S. Pat. No. 5,573,096. In that arrangement the required stroke length in the axial direction is determined by a stop ring whose length in the axial direction determines the stroke length. Different length stop rings may be selected. The requirement to have different length stop rings to accommodate various tolerance build-ups to give the precise required stroke length is an inconvenient aspect of the above mentioned system.

Adjustment of known clutch mechanisms typically requires at least partial disassembly of the differential or other assembly in which the clutch mechanism is incorporated. This is both inconvenient and time consuming.

The present invention is directed towards providing an improved shifting device which overcomes the aforementioned problems.

SUMMARY OF THE INVENTION

According to the invention there is provided a shifting device for a positively engaging clutch having complementary first and second positively engaging coupling elements, including a housing, an actuator rod which is axially movable within the housing by means of an associated rod actuating mechanism, a clutch shift fork engaged with the first coupling element and being mounted on the actuator rod for axial movement of the first coupling element into and out of engagement with the second coupling element in response to axial movement of the actuator rod, a fork position adjuster for axially adjusting the position of the clutch shift fork on the actuator rod, the clutch shift fork being mounted on the actuator rod by a threaded connector forming the fork position adjuster such that the clutch shift fork is axially movable on the actuator rod.

The shifting device of the invention provides an actuator rod or shaft which is mounted within a housing such that it is free to move axially within the housing. A clutch fork is mounted on the shaft in such a way that the fork moves axially with the shaft. Conveniently the axial position of the clutch fork on the shaft may be altered by rotating the shaft relative to the clutch fork for accurate positioning of the clutch fork relative to the coupling element with which it engages.

In one embodiment of the invention and access port is provided in a side wall of the housing to allow operation of the fork position adjuster from an exterior of the housing. Thus conveniently the position of the clutch shift fork can be readily easily adjusted from an exterior of the housing without having to dismantle the housing.

In another embodiment the access port is aligned with an end of the actuator rod to allow engagement of an adjusting tool with the end of the actuator rod for rotation of the actuator rod within the housing.

In one embodiment of the invention the clutch shift fork has a hub with a threaded bore which engages a complementary threaded portion of the actuator rod such that rotation of the actuator rod in the bore of the hub causes axial movement of the clutch shift fork along the actuator rod.

In another embodiment a locking element is provided for locking the clutch shift fork on the actuator rod. Conveniently the locking element engages between the hub and the actuator rod to prevent movement of the hub on the actuator rod.

In another embodiment the locking element comprises a locking plug mounted in a radial slot in the hub communicating with the threaded portion of the actuator rod.

In another embodiment means is provided to prevent rotation of the actuator rod in the housing.

In another embodiment a fork stroke adjuster is provided for adjusting the displacement of the clutch shift fork between a fully engaged position and a fully disengaged position.

In another embodiment the fork stroke adjuster is operable from an exterior of the housing.

In another embodiment the fork stroke adjuster comprises an adjustable stop which is provided on the housing to limit axial movement of the actuator rod within the housing.

In another embodiment the adjustable stop is an adjusting screw rotatably mounted on the housing adjacent one end of the actuator rod.

In another embodiment fixed stops are provided within the housing which cooperate with the actuator rod to limit axial movement of the actuator rod within the housing.

In another embodiment the rod actuating mechanism comprises a spring which urges the actuator rod against a first end stop and a ram which is operable to move the actuator axially in opposition to said spring against a second end stop.

In another embodiment the ram comprises a piston on the actuator rod which is slidably received in an associated cylindrical bore in the housing and forms with the housing a chamber for reception of pressurised fluid which acting on the piston opposes said spring bias.

In another embodiment there is provided a shifting device for a positively engaging clutch having complementary first and second positively engaging coupling elements, including a housing, an actuator rod which is axially movable within the housing by means of an associated rod actuating mechanism, a clutch shift fork engaged with the first coupling element and being mounted on the actuator rod for axial movement of the first coupling element into and out of engagement with the second coupling element in response to axial movement of the actuator rod, a fork position adjuster for axially adjusting the position of the clutch shift fork on the actuator rod, an access port being provided in a side wall of the housing to allow operation of the fork position adjuster from an exterior of the housing.

In another aspect the invention provides a differential assembly incorporating the shifting device as described herein.

In a further aspect the invention provides a gearbox incorporating the shifting device as described herein.

BRIEF DESCRIPTION OF THE DRAWINGS

The invention will be more clearly understood by the following description of some embodiments thereof, given by way of example only, with reference to the accompanying drawings, in which:

FIG. 4 is an elevational view of a half shaft assembly having a differential lock incorporating the shifting device of the invention according to a further embodiment of the invention;

FIG. 5 is a detail sectional view taken along the line V-V of FIG. 4; and

FIG. 6 is a detail sectional view taken along the line VI-VI of FIG. 5.

DETAILED DESCRIPTION OF THE PREFERRED EMBODIMENTS

Figure 1:
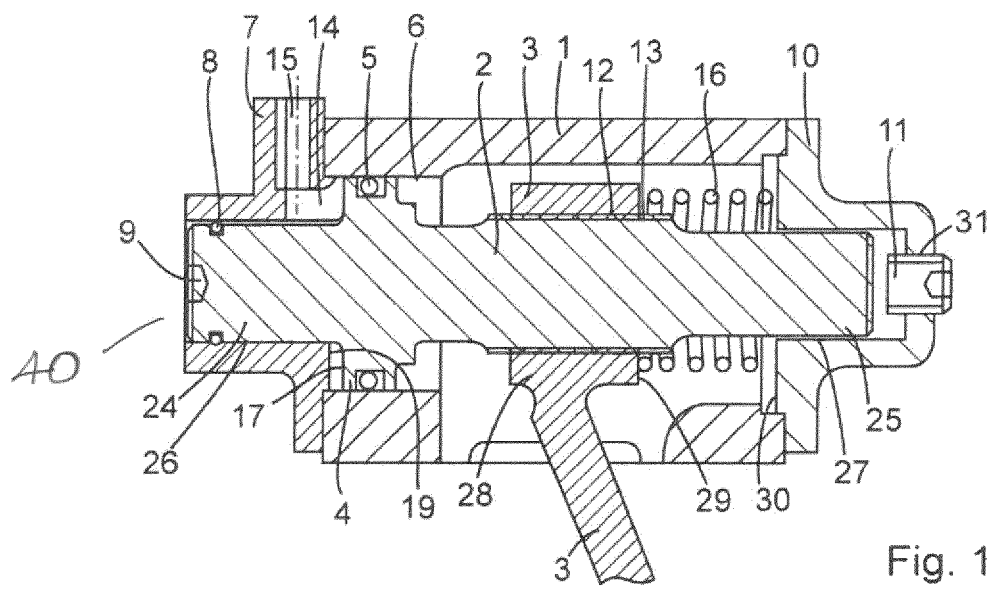
FIG. 1 is a sectional elevational view showing a shifting device for a positively engaging clutch according to a first embodiment of the invention.

The detailed construction and operation of the invention may be more clearly understood by reference initially to the embodiment shown in FIG. 1. A housing 1 having end covers 7, 10 contains an actuator rod formed by a shaft 2 on which is mounted a clutch actuating fork 3. The shaft 2 has a threaded portion 13 which engages the internal threads 12 of a bore in a hub 28 of the fork element 3 and this arrangement forms a fork position adjuster for axially adjusting the position of the clutch shift fork 3 on the actuator rod 2. A piston 4 is formed on the shaft 2 with a chamber 14 formed in the housing end cover 7 into which a fluid under pressure may be introduced through the threaded connection port 15. The piston 4 includes a seal element 5 which engages the cylindrical bore 6 in which the piston 4 can move axially. A further seal 8 on the shaft 2 prevents leakage of fluid from the chamber 14. Alternatively a cover cap may be fitted to the end cover 7 to prevent such leakage. Additionally means may be provided in such a cover cap to prevent rotation of the shaft 2. A means 9 which may be a hexagonal socket, a slot or other means is provided to enable the insertion of a suitable tool into the end of shaft 2 to enable rotation of shaft 2 relative to the housing 1 and the fork 3. It will be apparent that such rotation will cause axial movement of the fork 3 relative to the shaft 2 thus varying the position of the fork 3 relative to the housing 1 for a set position of the shaft 2. This axial adjustment of the fork 3 relative to the housing 1 enables the position of the fork 3 relative to the clutch jaws (not shown) to be adjusted as required to give the desired minimum clearance when the clutch is disengaged. An access port 40 is provided in a side wall of the housing 1, in this case in the housing end cover 7, aligned with an end of the shaft 2 to allow engagement of an adjusting tool with the means 9 at the end of the shaft 2 for rotation of the shaft 2 within the housing 1.

An adjusting screw 11 is fitted into a threaded hole 31 in the end cover 10. It will be apparent that the adjusting screw 11 provides a variable stop controlling the axial stroke length of the shaft 2 and so of the fork 3 which is fixed to the shaft 2 in the axial direction by means of the threads 12, 13. Axial motion to the left is limited by contact of a face 17 of piston 4 with an inner face 19 of the end cover 7. Movement of the shaft 2 to the right is caused by introducing pressurised fluid into the piston chamber 14 and movement to the left is caused by the force of the spring 16 when the fluid pressure is released. The adjusting screw 11 may be provided with a locking nut (not shown) to lock it in position when the desired adjustment has been made.

Each end 24, 25 of the shaft 2 is slidably supported in associated cylindrical bores 26, 27 in the end covers 7, 10. A collar or hub 28 on the clutch actuating fork 3 has a bore with internal threads 12. The spring 16 is mounted about the shaft 2 and extends between annular end face 29 of the hub 28 and an inner face 30 of the end cover 10.

Figure 2:
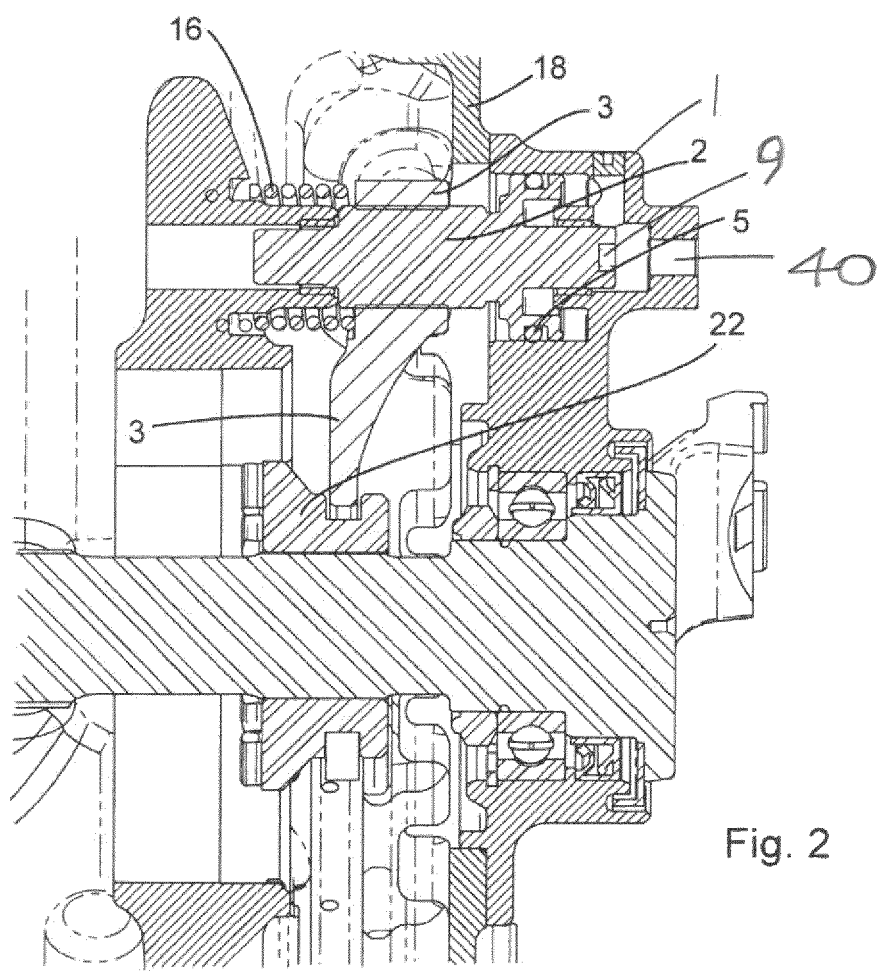
FIG. 2 is a sectional elevational view showing a shifting device according to a second embodiment of the invention.

A second embodiment of the invention is shown in FIG. 2 in which the invention is integrally incorporated into a gearbox/differential housing 18. Parts similar to those described previously are assigned the same reference numerals. In this figure the dog clutch 22 with which the clutch fork 3 engages can be seen. In this integrated system it has been found more advantageous to set the stroke length by reliance on the tolerancing of the shoulder on the shaft 2 and a corresponding stop shoulder on the gearbox housing 18.

Figure 3:
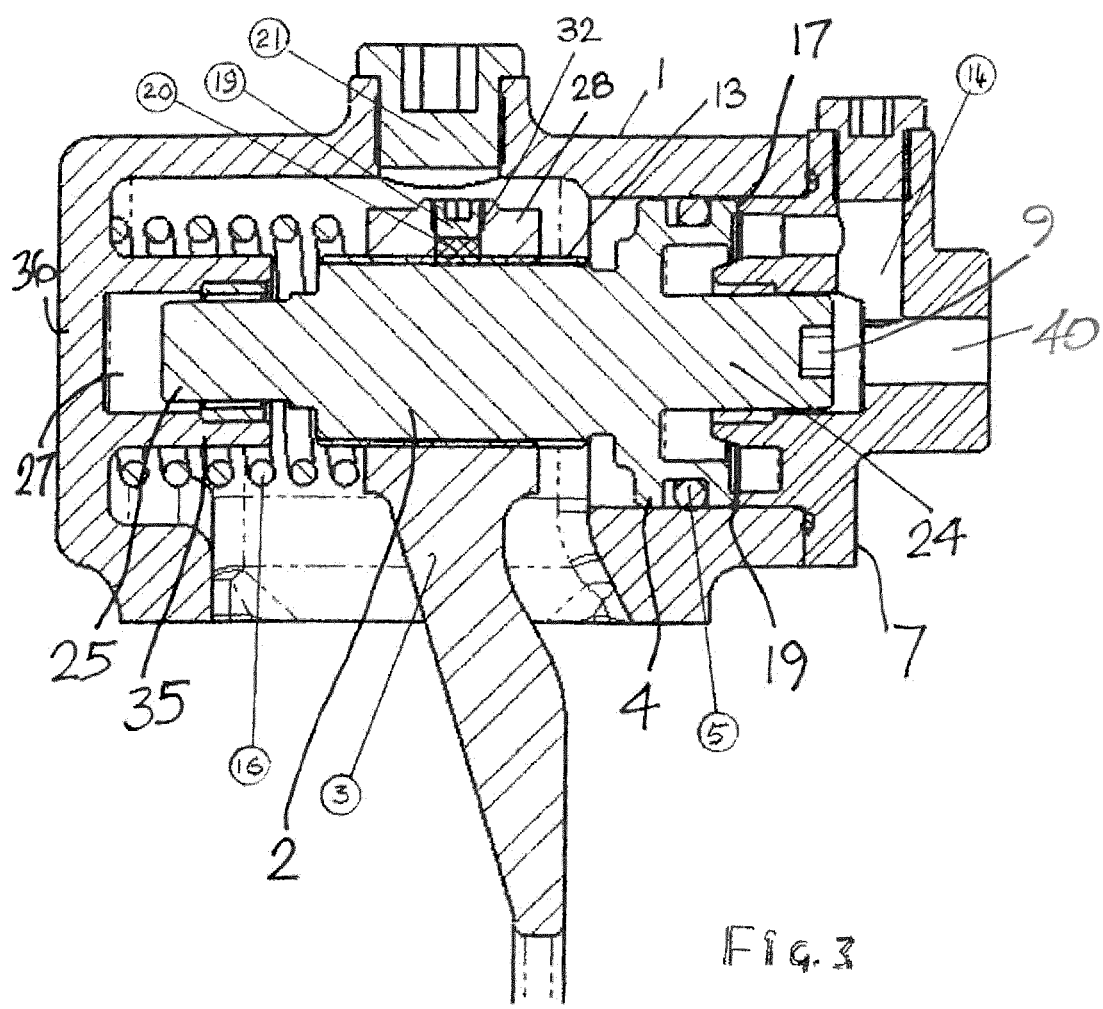
FIG. 3 is a sectional elevational view showing a shifting device according to a third embodiment of the invention.

A third embodiment of the invention is shown in FIG. 3. Parts similar to those described previously are assigned the same reference numerals. In this arrangement the hub 28 on the clutch fork 3 is provided with a threaded radial hole 32 in which a screwed plug 19 is fitted. The hole 32 extends through a side wall of the hub 28 and communicates with the threaded portion 13 on the shaft 2. The plug 19 acts on a washer 20 made of a suitable material such that it is compressed against the threads 13 on the shaft 2 so as to lock the threads 13 to prevent rotation without damaging the threads 13. The plug 19 is accessed by removing an associated outer plug 21 in a side wall of the housing 1. In this case also fixed end stops are provided within the housing 1 which cooperate with the shaft 2 to limit axial movement of the shaft 2 within the housing 1. A first fixed end stop comprises the inner face 19 of the end cover 7 which is engagable by the face 17 of the piston 4 as the shaft 2 moves to the right in the drawing. A second fixed end stop is provided at an opposite end of the housing 1 where the shaft 2 is engagable with a cylindrical bearing housing 35 projecting inwardly on an end wall 36 of the housing 1 and defining the bore 27 for slidable reception of the end 25 of the shaft 2 to limit axial movement of the shaft 2 to the left in the drawing.

Referring now in particular to FIGS. 4 to 6 there is shown a half shaft assembly indicated generally by the reference numeral 50 having a differential lock mechanism incorporating the shifting device of the invention. Parts similar to those described previously are assigned the same reference numerals. In this case the radial hole 32 and associated locking plug 19 and washer 20 are mounted at a side of the hub 28.

The present invention provides an adjustable clutch mechanism which features considerable improvements over the previously mentioned prior art. In the present invention both the position and the axial stroke length of the fork can be adjusted externally without disassembly of the mechanism and without the requirement for specially selected widths of components such as the aforementioned stop ring. Manufacture is greatly simplified in the present invention by reduction in the number of separate components and in the number of precision mating surfaces required. The possible build-up of tolerances affecting stroke length is also reduced. For example in the prior art the fork, piston and various rings and collars all move axially on a shaft requiring precision sliding fits of various components. These complexities are eliminated in the present invention.

The invention is not limited to the embodiments hereinbefore described which may be varied in both construction and detail within the scope of the appended claims.

The invention claimed is:

1. A shifting device for a positively engaging clutch having complementary first and second positively engaging coupling elements; comprising:
   a housing;
   an actuator rod which is axially movable within the housing by means of an associated rod actuating mechanism, the rod actuating mechanism comprises a spring which urges the actuator rod against a first end stop and a ram which is operable to move the actuator rod axially in opposition to said spring against a second end stop;
   a clutch shift fork engaged with the first coupling element and being mounted on the actuator rod for axial movement of the first coupling element into and out of engagement with the second coupling element in response to axial movement of the actuator rod;
   a fork position adjuster for axially adjusting position of the clutch shift fork on the actuator rod, the clutch shift fork being mounted on the actuator rod by a threaded connector forming the fork position adjuster such that the clutch shift fork is axially movable on the actuator rod; and
   an access port in a side wall of the housing to allow operation of the fork position adjuster from an exterior of the housing.

2. The shifting device as claimed in claim 1, wherein the access port is aligned with an end of the actuator rod to allow engagement of an adjusting tool with the end of the actuator rod for rotation of the actuator rod within the housing.

3. The shifting device as claimed in claim 1, wherein the clutch shift fork has a hub with a threaded bore which engages a complementary threaded portion of the actuator rod such that rotation of the actuator rod in the bore of the hub causes axial movement of the clutch shift fork along the actuator rod.

4. The shifting device as claimed in claim 1, further comprising a fork stroke adjuster for adjusting the displacement of the clutch shift fork between a fully engaged position and a fully disengaged position, the fork stroke adjuster comprises an adjustable stop which is provided on the housing to limit axial movement of the actuator rod within the housing.

5. The shifting device as claimed in claim 4, wherein the fork stroke adjuster is operable from an exterior of the housing.

6. The shifting device as claimed in claim 4, wherein the adjustable stop is an adjusting screw rotatably mounted on the housing adjacent one end of the actuator rod.

7. The shifting device as claimed in claim 1, further comprising fixed stops within the housing which cooperate with the actuator rod to limit axial movement of the actuator rod within the housing.

8. The shifting device as claimed in claim 1, wherein the ram comprises a piston on the actuator rod which is slidably received in an associated cylindrical bore in the housing and forms with the housing a chamber for reception of pressurized fluid which acting on the piston opposes said spring bias.

9. A differential assembly incorporating the shifting device as claimed in claim 1.

10. A gearbox incorporating the shifting device as claimed in claim 1.

11. A shifting device for a positively engaging clutch having complementary first and second positively engaging coupling elements comprising:
   a housing;
   an actuator rod which is axially movable within the housing by means of an associated rod actuating mechanism, the rod actuating mechanism comprises a spring which urges the actuator rod against a first end stop and a ram which is operable to move the actuator rod axially in opposition to said spring against a second end stop;
   a clutch shift fork engaged with the first coupling element and being mounted on the actuator rod for axial movement of the first coupling element into and out of engagement with the second coupling element in response to axial movement of the actuator rod; and
   a fork position adjuster for axially adjusting position of the clutch shift fork on the actuator rod, the clutch shift fork being mounted on the actuator rod by a threaded connector forming the fork position adjuster such that the clutch shift fork is axially movable on the actuator rod, the clutch shift fork has a hub with a threaded bore which engages a complementary threaded portion of the actuator rod such that rotation of the actuator rod in the bore of the hub and relative to the housing causes axial movement of the clutch shift fork along the actuator rod.

12. A shifting device for a positively engaging clutch having complementary first and second positively engaging coupling elements comprising:
   a housing;
   an actuator rod which is axially movable within the housing by means of an associated rod actuating mechanism, the rod actuating mechanism comprises a spring which urges the actuator rod against a first end stop and a ram which is operable to move the actuator rod axially in opposition to said spring against a second end stop;
   a clutch shift fork engaged with the first coupling element and being mounted on the actuator rod for axial movement of the first coupling element into and out of engagement with the second coupling element in response to axial movement of the actuator rod; and
   a fork position adjuster for axially adjusting position of the clutch shift fork on the actuator rod, the clutch shift fork being mounted on the actuator rod by a threaded connector forming the fork position adjuster such that the clutch shift fork is axially movable on the actuator rod; and
   a fork stroke adjuster for adjusting the displacement of the clutch shift fork between a fully engaged position and a fully disengaged position, the fork stroke adjuster comprises an adjustable stop which is provided on the housing to limit axial movement of the actuator rod within the housing, the fork stroke adjuster being operable from an exterior of the housing.

* * * * *